June 22, 1926.
H. S. LEE
PERMANENT MOLD
Filed Oct. 2, 1924
1,589,604
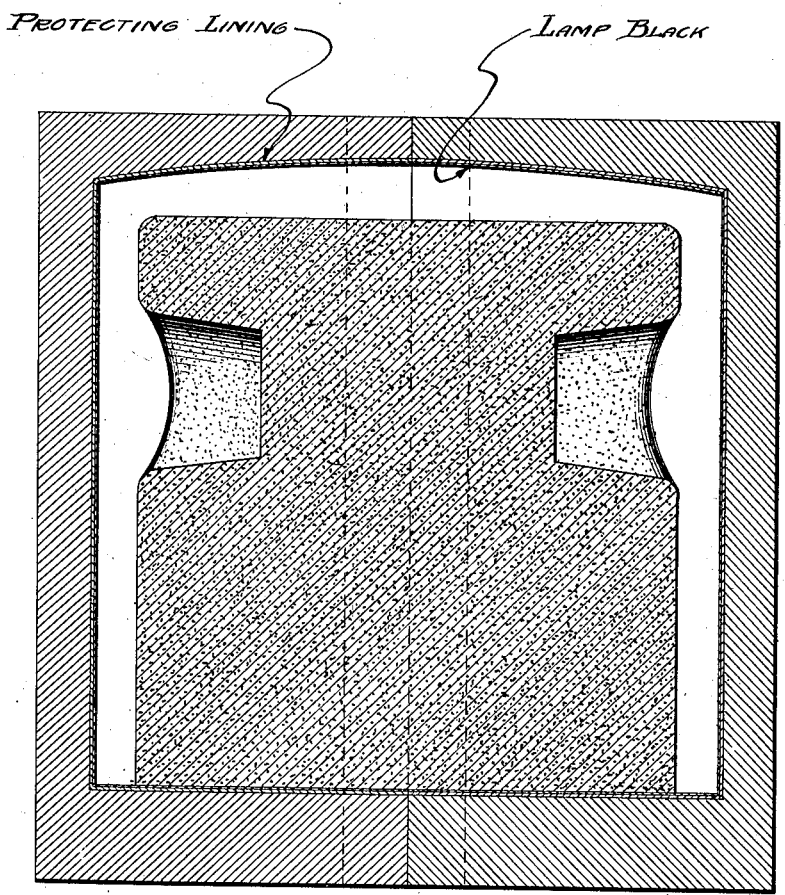
Inventor
Harry S. Lee
By Stuart C. Barnes
Attorney Patented June 22, 1926.

1,589,604

UNITED STATES PATENT OFFICE.

HARRY S. LEE, OF PLYMOUTH, MICHIGAN.

PERMANENT MOLD.

Application filed October 2, 1924. Serial No. 741,128.

This invention relates to permanent molds and has for its object a permanent mold coated with fire or heat-resisting compound which becomes a part of the mold for a long period of time. This enables the casting of ferrous metals in cast iron molds without the necessity of subsequent annealing operations to remove the "chill".

In the drawings:

The figure shows a mold coated with my improved lining.

The substance that I use as the basis of my fire resisting lining is kieselguhr or infusorial earth. Kieselguhr is a heat-resisting material of a very high efficiency.

With kieselguhr I use a suitable acid to cut the kieselguhr and to further comminute the particles of the powdered kieselguhr. In mixing and preparing my compound I take say a ten or fifteen percent solution of the acid in water. I find that a great many acids or substances are suitable for this purpose, but preferably hydrofluoric acid or hydrochloric acid (muriatic acid), or ammonia will suitably accomplish my purpose. I then mix the powdered kieselguhr into this acid and water solution until the parts have been made into a pasty consistency.

I also prepare a mixture of silicate of soda (water glass) and water. I can use equal parts or such proportions as $\frac{1}{3}$ silicate of soda and $\frac{2}{3}$ water. In fact, there may be considerable variation in these proportions and measurably good results obtained.

The silicate of soda is used in order to form an appropriate binder. Silicate of soda or water glass is a substance that has fairly high heat-resisting properties and at the same time makes a very desirable binder.

I then mix together this silicate of soda and water and the kieselguhr paste already referred to, in such proportions as to obtain about the same consistency as ordinary paint. This substance is then spread or sprayed onto the mold wall and allowed to dry from 12 to 14 hours. I find that the substance bakes onto the mold and forms a permanent facing or coating and that the same will last and give good castings for from three to four thousand pourings. However, it will be found most desirable, and in fact quite essential, to use in connection with this coating a superficial coating of lamp black, which preferably can be smoked on, as by using an acetylene torch. The lamp black, of course, will be applied before each pouring and serves largely as a parting to prevent the casting from sticking to the fire-resisting coating and stripping part of the coating off when the casting is removed.

My improved heat-resisting coating is very efficient in two respects. One of the purposes of the coating is to protect the metal of the mold from being melted by the extreme heat of the contents of the mold. Another very important function that is accomplished by the kieselguhr is to prevent heat exchange and protect the casting itself in chilling. It is a well known fact in making steel and iron castings that iron mold parts can be used to chill the casting. A chilled casting can not ordinarily be used as it is impossible to properly machine chilled iron. In those permanent molds, where iron has been used, it has been usually found necessary to anneal the castings afterwards in order to remove the chill. By using my improved coating I find that this chilling of the iron is avoided and annealing is unnecessary in order to prepare the castings for machining.

I find that the acid for comminuting can be omitted, but I prefer to use this as it gives better results.

What I claim is:

1. A mold, having a body built of a substance calculated to melt at a point approximating the melting point of the substance used in casting, and a baked on heat insulating lining for said mold comprising kieselguhr and a suitable binder.

2. A mold, having a body constructed of a substance calculated to melt at approximately the melting point of the substance used in casting, and a quasi-permanent heat insulating lining therefor comprising kieselguhr and silicate of soda.

3. A mold, having a body constructed of a substance calculated to melt at approximately the melting point of the substance used in casting, and a quasi-permanent heat insulating lining therefor comprising kieselguhr comminuted with acid and a heat-resisting binder.

In testimony whereof I have affixed my signature.

HARRY S. LEE.